US012688271B2

(12) United States Patent
   Takahashi

(10) Patent No.: US 12,688,271 B2
(45) Date of Patent: Jul. 21, 2026

(54) BIOMETRICS APPARATUS, BIOMETRICS METHOD, AND RECORDING MEDIUM

(71) Applicant: NEC Corporation, Tokyo (JP)

(72) Inventor: Koichi Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 166 days.

(21) Appl. No.: 18/700,773

(22) PCT Filed: Nov. 2, 2021

(86) PCT No.: PCT/JP2021/040336
   § 371 (c)(1),
   (2) Date: Apr. 12, 2024

(87) PCT Pub. No.: WO2023/079587
   PCT Pub. Date: May 11, 2023

(65) Prior Publication Data
   US 2024/0411846 A1    Dec. 12, 2024

(51) Int. Cl.
   *G06F 21/32*    (2013.01)
   *G06V 10/44*    (2022.01)
   *G06V 40/16*    (2022.01)

(52) U.S. Cl.
   CPC .............. *G06F 21/32* (2013.01); *G06V 10/44* (2022.01); *G06V 40/172* (2022.01)

(58) Field of Classification Search
   CPC ....... G06F 21/32; G06V 10/44; G06V 40/172
   See application file for complete search history.

(56) References Cited

U.S. PATENT DOCUMENTS

| | | | |
|---|---|---|---|
| 8,254,647 B1 | 8/2012 | Nechyba et al. | |
| 2013/0216095 A1 | 8/2013 | Yabuki | |
| 2016/0034557 A1* | 2/2016 | Araki ...................... | G06F 16/23 707/737 |
| 2017/0083755 A1 | 3/2017 | Tang et al. | |
| 2017/0337414 A1 | 11/2017 | Ohno et al. | |

(Continued)

FOREIGN PATENT DOCUMENTS

| | | |
|---|---|---|
| CN | 112036383 A | 12/2020 |
| JP | 2008-040874 A | 2/2008 |

(Continued)

OTHER PUBLICATIONS

JP Office Communications for JP Application No. 2023-557856, mailed on Jan. 21, 2025 with English Translation.

(Continued)

*Primary Examiner* — Brian Whipple
(74) *Attorney, Agent, or Firm* — Sughrue Mion, PLLC

(57) ABSTRACT

Provided are: an extraction unit that extracts a target feature quantity that is a feature quantity of target data used to perform a recognition operation; a calculation unit that calculates an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition and a determination unit that determines whether or not the target data are unsuitable for the recognition operation in accordance with the unsuitability score.

14 Claims, 4 Drawing Sheets

(56)  References Cited

U.S. PATENT DOCUMENTS

| | | | | |
|---|---|---|---|---|
| 2019/0278247 | A1* | 9/2019 | Abe | G05B 19/41885 |
| 2022/0043895 | A1 | 2/2022 | Nakazaki et al. | |
| 2022/0237274 | A1* | 7/2022 | Paul | G06F 21/35 |
| 2022/0406093 | A1* | 12/2022 | Takashima | G06V 40/168 |

FOREIGN PATENT DOCUMENTS

| | | | |
|---|---|---|---|
| JP | 2012-133411 | A | 7/2012 |
| JP | 2012-160001 | A | 8/2012 |
| JP | 2013-142930 | A | 7/2013 |
| JP | 2013-171325 | A | 9/2013 |
| JP | 2017-517076 | A | 6/2017 |
| JP | 2020-057275 | | 4/2020 |
| JP | 2020-129298 | A | 8/2020 |
| JP | 2021-157558 | A | 10/2021 |
| WO | 2016/067556 | A1 | 5/2016 |
| WO | 2021/131029 | A1 | 7/2021 |

OTHER PUBLICATIONS

JP Office Action for JP Application No. 2023-557856, mailed on Aug. 13, 2024 with English Translation.
International Search Report for PCT Application No. PCT/JP2021/040336, mailed on Jan. 25, 2022.
Siqi Deng et al., "Harnessing Unrecognizable Faces for Face Recognition" arXiv: 2106.04112v1 [cs.CV] Jun. 8, 2021.

* cited by examiner

BIOMETRICS APPARATUS, BIOMETRICS METHOD, AND RECORDING MEDIUM

This application is a National Stage Entry of PCT/JP2021/040336 filed on Nov. 2, 2021, the contents of all of which are incorporated herein by reference, in their entirety.

TECHNICAL FIELD

This disclosure relates to technical fields of a biometrics apparatus, a biometrics method, and a recording medium.

BACKGROUND ART

Patent literature 1 describes a technique/technology of comparing vectors respectively extracted from face areas selected by two face images to be compared, thereby to acquire a face recognition score. Furthermore, Patent literature 2 describes a technique/technology of determining a position variation of a background separation image and of preventing an unsuitable image from being used in a processing after generation of the background separation image, by prohibiting a recognition processing in a case where an index that provides a determination of being stationary is less than or equal to a certain number, or by discarding the background separation image without using it as training data in a case where a magnitude of the position variation of the background separation image is greater than a certain threshold. Furthermore, Patent literature 3 describes a technique/technology of determining a recognition error and notifying a display unit, a speaker, or the like of the fact and reason of the recognition error, in a case where a degree of coincidence or a degree of correlation with recognition information in reliability information is determined to be lower than a predetermined value, and in a case where an amplitude of a pulse wave signal of survival information in the reliability information is determined to be smaller than a predetermined amplitude. In addition, Patent literature 4 describes a technique/technology of setting a different threshold for a success in face recognition in accordance with the number of registered face images or feature quantities such that a calculation criterion of a recognition score varies depending on the number of registered face images or feature quantities. Furthermore, Patent literature 5 describes a technique/technology of correcting a score that is a collation/verification result of face verification, on the basis of a score distribution. In addition, Non-Patent Literature 1 describes a technique/technology of preventing incorrect/false recognition caused by inputting an image that is unsuitable for recognition by utilizing the fact that images in which individuality is lost, have similar feature quantities, in face recognition in which a cosine similarity is used as a matching score.

CITATION LIST

Patent Literature

Patent Literature 1: JP2017-517076A

Patent Literature 2: JP2020-129298A

Patent Literature 3: International Publication No. WO2016/067556

Patent Literature 4: JP2013-142930A

Patent Literature 5: JP2008-40874A

Non-Patent Literature

Non-Patent Literature 1: Siqi Deng, "Harnessing Unrecognizable Faces for Face Recognition" (arXiv 2021)

SUMMARY

Technical Problem

It is an example object of this disclosure to provide a biometrics apparatus, a biometrics method, and a recording medium that are intended to improve the techniques/technologies described in Citation List.

Solution to Problem

A biometrics apparatus according to an example aspect of this disclosure includes: an extraction unit that extracts a target feature quantity that is a feature quantity of target data used to perform a recognition operation; a calculation unit that calculates an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and a determination unit that determines whether or not the target data are unsuitable for the recognition operation in accordance with the unsuitability score.

A biometrics method according to an example aspect of this disclosure includes: extracting a target feature quantity that is a feature quantity of target data used to perform a recognition operation; calculating an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and determining whether or not the target data are unsuitable for the recognition operation in accordance with the unsuitability score.

A recording medium according to an example aspect of this disclosure is a recording medium on which a computer program that allows a computer to execute a biometrics method is recorded, the biometrics method including: extracting a target feature quantity that is a feature quantity of target data used to perform a recognition operation;

calculating an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and determining whether or not the target data are unsuitable for the recognition operation in accordance with the unsuitability score.

DESCRIPTION OF EXAMPLE EMBODIMENTS

Hereinafter, a biometrics apparatus, a biometrics method, and a recording medium according to example embodiments will be described with reference to the drawings.

1: First Example Embodiment

First, a biometrics apparatus, a biometrics method, and a recording medium according to a first example embodiment will be described. The following describes the biometrics apparatus, the biometrics method, and the recording medium according to the first example embodiment, by using a biometrics apparatus 1 to which the biometrics apparatus, the biometrics method, and the recording medium according to the first example embodiment are applied.

[1-1: Configuration of Biometrics Apparatus 1]

Figures 1, 2:
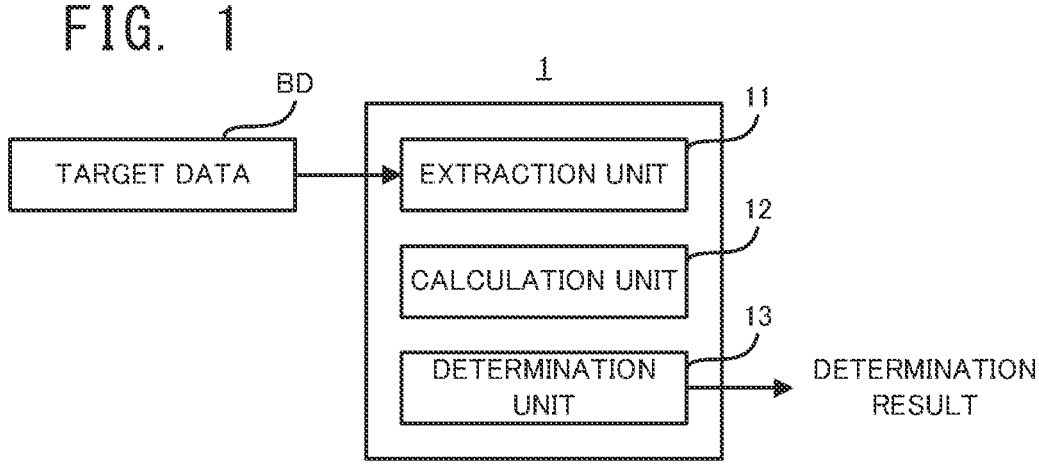
FIG. 1 is a block diagram illustrating a configuration of a biometrics apparatus in a first example embodiment.
FIG. 2 is a block diagram illustrating a configuration of a biometrics apparatus in a second example embodiment.

FIG. 1 is a block diagram illustrating a configuration of the biometrics apparatus 1 in the first example embodiment. As illustrated in FIG. 1, the biometrics apparatus 1 includes an extraction unit 11, a calculation unit 12, and a determination unit 13.

The extraction unit 11 extracts a target feature quantity that is a feature quantity of target data BD used to perform a recognition operation. The target data are data about a recognition target. The calculation unit 12 calculates an unsuitability score indicating a degree of similarity between an unsuitability feature quantity and the target feature quantity. The unsuitability feature quantity is set on the basis of a feature quantity of each piece of a plurality of sample data that deteriorate accuracy of a recognition operation due to having the same type of unsuitability for recognition. The determination unit 13 determines whether or not the target data BD are unsuitable for the recognition operation, in accordance with the unsuitability score.

In biometrics, it is known that the accuracy of the recognition operation is deteriorated and incorrect recognition is increased when the recognition is performed by using data of particular properties. Such data that deteriorate the accuracy of the recognition operation are referred to as data having the unsuitability for recognition. The data having the unsuitability for recognition may be an image in which a factor that prevents an adequate recognition operation, is included with the recognition target, in a case where the target data are an image about the recognition target, for example. A specific example in this situation includes an image captured in a condition where the recognition target is unsuitable, an image captured in a condition where a surrounding environment of the recognition target is unsuitable, an image captured in a condition where setting or the like of an imaging device is unsuitable, or the like. In addition, the data having the unsuitability for recognition may be an image in which the recognition target is included in a condition where individuality of the recognition target is lost, or an image in which the recognition target is not actually included, or the like. A specific example includes an image in which a main part of the recognition target is hidden, an image in which the surrounding of the recognition target is extremely bright or dark, an image in which a boundary between the recognition target and the surrounding environment is hard to see, an image in which an object is not considerably focused, an image of remarkably low resolution, an image captured by a camera with a dirty lens, or the like. In addition, the data having the unsuitability for recognition may be an image that is possibly erroneously determined to include a person's face and is possibly acquired as a face image, in a case where the target data are the face image in which the person's face is captured. A specific example in such a case includes an image of a painting such as a portrait, an image of a statue such as a sculpture, a face image of an animal such as a monkey, an image of a pattern that looks like a person's face, or the like.

In a case where an individual is recognized by using the data having the unsuitability for recognition, another person could be incorrectly/falsely recognized. In this way, in a case where the target data are the data having the unsuitability for recognition, the data are unsuitable for the recognition operation, and it is thus not desirable to use the target data for the recognition operation.

The data having the unsuitability for recognition have similar feature quantities. Furthermore, of the unsuitability for recognition, the respective feature quantities of the data having the same type of unsuitability for recognition are particularly similar. Therefore, in a case where the unsuitability feature quantity that is set on the basis of the feature quantity of each piece of a plurality of sample data having the same type of unsuitability for recognition, is similar to the feature quantity of the target data used to perform the recognition operation, the target data are considered to have the corresponding type of unsuitability for recognition. Since the target data are considered to possibly deteriorate the accuracy of the recognition operation due to having the unsuitability for recognition, it is desirable not to use the target data for the recognition.

Therefore, the biometrics apparatus 1 in the first example embodiment calculates the unsuitability score indicating the degree of similarity between the unsuitability feature quantity and the target feature quantity, and determines whether or not the target data are unsuitable for the recognition operation in accordance with the unsuitability score. The unsuitability feature quantity is a feature quantity that is set on the basis of the feature quantity of each piece of the plurality of sample data having the same type, i.e., one type of unsuitability for recognition. Therefore, the unsuitability feature quantity is superior, in representing one type of unsuitability for recognition, to a feature quantity that is set on the basis of the feature quantity of each piece of the plurality of sample data having a plurality of types of unsuitability for recognition.

[1-2: Technical Effect of Biometrics Apparatus 1]

As described above, the biometrics apparatus 1 in the first example embodiment is configured to accurately determine whether or not the target data are unsuitable for the recognition operation, and it is thus possible to prevent the incorrect recognition.

2: Second Example Embodiment

Next, a biometrics apparatus, a biometrics method, and a recording medium according to a second example embodiment will be described. The following describes the biometrics apparatus, the biometrics method, and the recording medium according to the second example embodiment, by using a biometrics apparatus 2 to which the biometrics apparatus, the biometrics method, and the recording medium according to the second example embodiment are applied.

[2-1: Configuration of Biometrics Apparatus 2]

First, with reference to FIG. 2, a configuration of the biometrics apparatus 2 in the second example embodiment will be described. FIG. 2 is a block diagram illustrating the configuration of the biometrics apparatus 2 in the second example embodiment. In the following description, the components already described carry the same reference numerals, and a detailed description thereof will be omitted.

As illustrated in FIG. 2, the biometrics apparatus 2 includes an arithmetic apparatus 21 and a storage apparatus 22. In addition, the biometrics apparatus 2 may include a communications apparatus 23, an input apparatus 24, and an output apparatus 25. The biometrics apparatus 2, however, may not include at least one of the communication apparatus 23, the input apparatus 24, and the output apparatus 25. The arithmetic apparatus 21, the storage apparatus 22, the communication apparatus 23, the input apparatus 24, and the output apparatus 25 may be connected through a data bus 26.

The arithmetic apparatus 21 includes at least one of a CPU (Central Processing Unit), a GPU (Graphics Processing Unit), and a FPGA (Field Programmable Gate Array), for example. The arithmetic apparatus 21 reads a computer program. For example, the arithmetic apparatus 21 may read a computer program stored in the storage apparatus 22. For example, the arithmetic apparatus 21 may read a computer program stored by a computer-readable and non-transitory recording medium, by using a not-illustrated recording medium reading apparatus provided in the biometrics apparatus 2 (e.g., the input apparatus 24 described later). The arithmetic apparatus 21 may acquire (i.e., download or read) a computer program from a not-illustrated apparatus disposed outside the biometrics apparatus 2 through the communication apparatus 23 (or another communication apparatus). The arithmetic apparatus 21 executes the read computer program. Consequently, a logical functional block for performing an operation to be performed by the biometrics apparatus 2 is realized or implemented in the arithmetic apparatus 21. That is, the arithmetic apparatus 21 is allowed to function as a controller for realizing or implementing the logical functional block for performing an operation (in other words, a processing) to be performed by the biometrics apparatus 2.

FIG. 2 illustrates an example of the logical functional block realized or implemented in the arithmetic apparatus 21 to perform a biometrics operation. As illustrated in FIG. 2, an extraction unit 211 that is a specific example of the "extraction unit", a calculation unit 212 that is a specific example of the "calculation unit", a determination unit 213 that is a specific example of the "determination unit", a presentation unit 214 that is a specific example of the "presentation unit", a correction unit 215 that is a specific example of the "correction unit", and a recognition unit 216, are realized or implemented in the arithmetic apparatus 21.

Details of operation of each of the extraction unit 211, the calculation unit 212, the determination unit 213, the presentation unit 214, and the correction unit 215 will be described in detail later with reference to FIG. 3 and FIG. 4. The arithmetic apparatus 21, however, may not include at least one of the presentation unit 214, the correction unit 215, and the recognition unit 216.

The storage apparatus 22 is configured to store desired data. For example, the storage apparatus 22 may temporarily store a computer program to be executed by the arithmetic apparatus 21. The storage apparatus 22 may temporarily store data that are temporarily used by the arithmetic apparatus 21 when the arithmetic apparatus 21 executes the computer program. The storage apparatus 22 may store data that are stored by the biometrics apparatus 2 for a long time. The storage apparatus 22 may include at least one of a RAM (Random Access Memory), a ROM (Read Only Memory), a hard disk apparatus, a magneto-optical disk apparatus, a SSD (Solid State Drive), and a disk array apparatus. That is, the storage apparatus 22 may include a non-transitory recording medium.

The storage apparatus 22 may store a feature quantity generation model GM, a registered feature quantity CC, and an unsuitability feature quantity WC. The storage apparatus 22, however, may not store the feature quantity generation model GM, the registered feature quantity CC, and the unsuitability feature quantity WC. The feature quantity generation model GM and the registered feature quantity CC will be described later.

The communication apparatus 23 is configured to communicate with an external apparatus of the biometrics apparatus 2 through a not-illustrated communication network.

The input apparatus 24 is an apparatus that receives an input of information to the biometrics apparatus 2 from an outside of the biometrics apparatus 2. For example, the input apparatus 24 may include an operating apparatus (e.g., at least one of a keyboard, a mouse, and a touch panel) that is operable by an operator of the biometrics apparatus 2. For example, the input apparatus 24 may include a reading apparatus that is configured to read information recorded as data on a recording medium that is externally attachable to the biometrics apparatus 2.

The output apparatus 25 is an apparatus that outputs information to the outside of the biometrics apparatus 2. For example, the output apparatus 25 may output the information as an image. That is, the output apparatus 25 may include a display apparatus (a so-called display) that is configured to display an image indicating the information that is desirably outputted. For example, the output apparatus 25 may output information as audio. That is, the output apparatus 25 may include an audio apparatus (a so-called speaker) that is configured to output audio. For example, the output apparatus 25 may output information onto a paper surface. That is, the output apparatus 25 may include a print apparatus (a so-called printer) that is configured to print desired information on the paper surface.

In the second example embodiment, each of the target data BD and the plurality of sample data may be a biological image in which a living body that is a target of the recognition operation is included. The unsuitability for recognition may include at least one of (i) unsuitability that the living body is included in the biological image in a condition where at least a part of the living body is blurred, (ii) unsuitability that the living body is included in the biological image in a condition where at least a part of the living body is shielded by a shield object, and (iii) unsuitability that the biological image is superimposed with a noise.

The unsuitability feature quantity WC includes at least a first unsuitability feature quantity 1WC, which is set on the basis of the feature quantity of each piece of a plurality of first sample data that deteriorate the accuracy of the recognition operation due to having a first type of unsuitability for recognition, and a second unsuitability feature quantity 2WC, which is set on the basis of the feature quantity of each piece of a plurality of second sample data that deteriorate the accuracy of the recognition operation due to having a second type of unsuitability for recognition, which is different from the first type. For example, the first type of unsuitability for recognition may be one of the above (i) to (iii), and the second type of unsuitability for recognition may be another one of the above (i) to (iii). In addition, there may be a third type of unsuitability for recognition, and the third type of unsuitability for recognition may be one other than the first type of unsuitability for recognition, and the second type of unsuitability for recognition that are the above (i) to (iii). In addition, there may be a fourth or more types of unsuitability for recognition. In an example illustrated below, a case where there are the first type of unsuitability for recognition and the second type of unsuitability for recognition will be described.

Before the biometrics operation, the feature quantity generation model GM is constructed, the registered feature quantity CC is registered, and the unsuitability feature quantity WC is registered.

[2-2: Construction of Feature Quantity Generation Model GM]

The feature quantity generation model GM is a model capable of generating a feature quantity of the biological image when the biological image is inputted. The feature quantity generation model GM may be constructed by machine learning to generate the same feature quantity in a case where the biological image of the same individual is inputted. Specifically, the feature quantity generation model GM may be constructed by adjusting a parameter of the feature quantity generation model GM to reduce (preferably, minimize) a loss function that is set on the basis of an error of a plurality of feature quantities generated from the biological image of the same individual. The feature quantity generation model GM may be constructed as a convolution neural network that generates the feature quantity by a convolution processing, for example. The feature quantity generation model GM may be, for example, VGG or RewNet, and may be learned/trained by using DeepFace orArcFace. The feature quantity generation model GM may be a model capable of accurately generating the feature quantity, and may be another learned/trained engine.

For example, there are assumed to be the three types of unsuitability for recognition (i), (ii), and (iii). Assumed is a case where a decision model for determining whether or not the data have each of the types of the unsuitability is constructed and used by machine learning. In this case, it is necessary to construct three types of decision models: a decision model for the unsuitability for recognition (i), a decision model for the unsuitability for recognition (ii), and a decision model for the unsuitability for recognition (iii). Apart from each decision model, there is also a need to construct a model for the biometrics, such as a model for generating the feature quantity of the biological image.

In contrast, the biometrics apparatus 2 in the second example embodiment may prepare only the feature quantity generation model GM that is machine-learned and constructed to generate the feature quantity to be used in the recognition. That is, in the biometrics apparatus 2 in the second example embodiment, the model to be constructed is only one type, which is the feature quantity generation model GM. This feature quantity generation model GM generates the registered feature quantity CC that is a feature quantity of registered data CD, and generates a target feature quantity BC that is a feature quantity of the target data. In addition, the feature quantity generation model GM also generates the feature quantity of each piece of the plurality of sample data having the unsuitability for recognition. The unsuitability feature quantity WC is set on the basis of the feature quantity generated by the feature quantity generation model GM.

Therefore, the biometrics apparatus 2 in the second example embodiment has a simple configuration. The generation of each of the registered feature quantity CC, the target feature quantity BC, and the feature quantity of each piece of the plurality of sample data having the unsuitability for recognition, will be described later with reference to FIG. 3 and FIG. 4.

[2-3: Operation of Setting Unsuitability Feature Quantity WC Performed by Biometrics Apparatus 2]

Next, with reference to FIG. 3, the operation of setting the unsuitability feature quantity WC performed by the biometrics apparatus 2 in the second example embodiment will be described. FIG. 3 is a flowchart illustrating a flow of the operation of setting the unsuitability feature quantity WC performed by the biometrics apparatus 2 in the second example embodiment.

Figure 3:
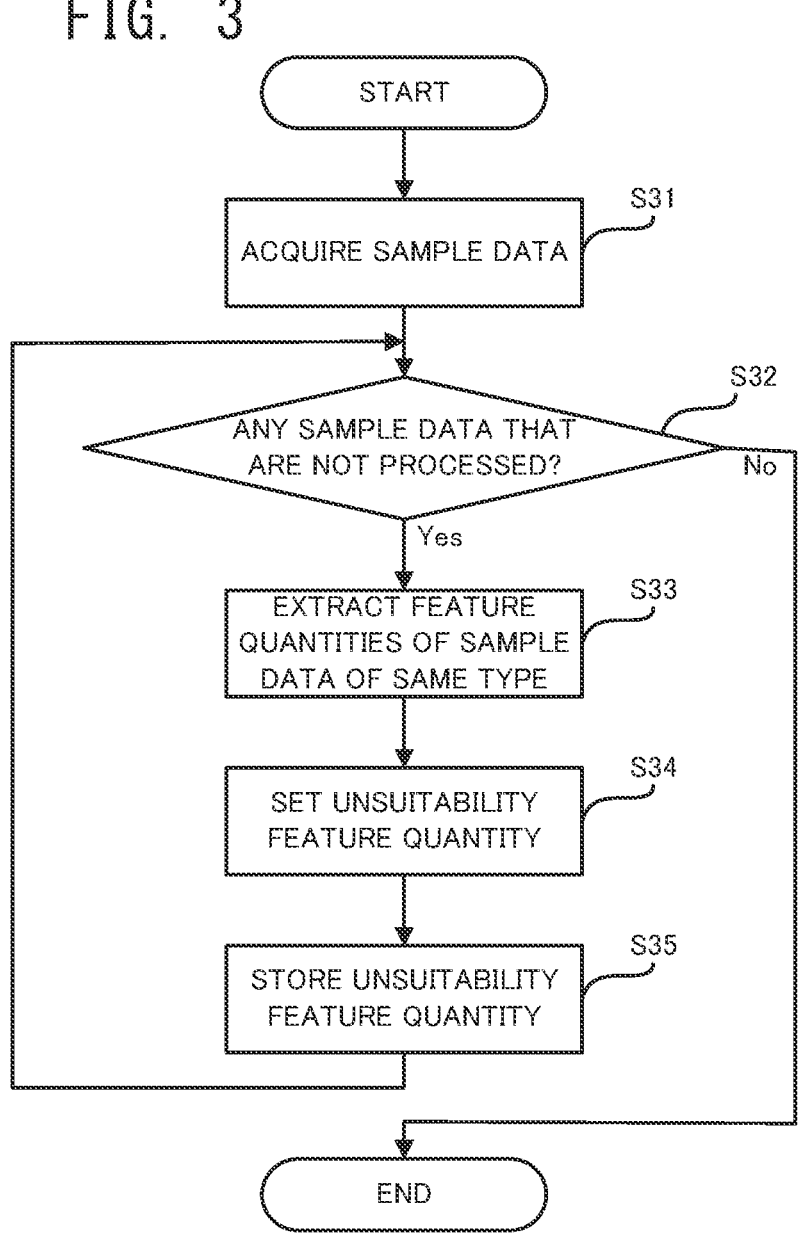
FIG. 3 is a flowchart illustrating a flow of an operation of setting an unsuitability feature quantity WC, performed by the biometrics apparatus in the second example embodiment.

As illustrated in FIG. 3, the extraction unit 211 acquires a plurality of sample data that deteriorate the accuracy of the recognition operation (step S31). The extraction unit 211 determines whether or not there are sample data that are not processed (step S32).

As a result of the determination in the step S32, when there are sample data that are not processed (the step S32: Yes), the extraction unit 211 extracts the feature quantities of a plurality of sample data having the same type of unsuitability for recognition unsuitability for recognition from the sample data that are not processed (step S33). The extraction unit 211 may extract the feature quantities from the plurality of sample data by using the feature quantity generation model GM.

The extraction unit 211 sets the unsuitability feature quantity WC on the basis of the feature quantity of each piece of the plurality of sample data having the same type of unsuitability for recognition (step S34), and stores it in the storage apparatus 22 (step S35). Here, the unsuitability feature quantity WC may be, for example, a mean value of the respective feature quantities of the plurality of sample data. For example, in a case where the feature quantity of each piece of the plurality of sample data can be expressed by a vector, the unsuitability feature quantity WC may be a normalized mean vector of respective feature vectors of the plurality of sample data. In a case where the unsuitability feature quantity WC is a mean value, it is possible to generate the unsuitability feature quantity that equally includes the unsuitability for recognition possessed by each piece of the sample data, and that well represents the feature quantity that is unsuitable for the recognition. The unsuitability feature quantity WC may be a representative feature quantity of the unsuitability for recognition, and may be obtained by an arbitrary method, such as calculation of a weighted mean value.

After the step S35, the processing proceeds to the step S32. As a result of the determination, when there are no sample data that are not processed (the step S32: No), the operation of setting the unsuitability feature quantity WC is ended.

For example, in a case where the sample data having two types of unsuitability for recognition are included, the operation in the step S33 to the step S35 is repeated twice.

[2-4: Biometrics Operation Performed by Biometrics Apparatus 21]

Next, with reference to FIG. 4, the biometrics operation performed by the biometrics apparatus 2 in the second example embodiment will be described. FIG. 4 is a flowchart illustrating a flow of the biometrics operation performed by the biometrics apparatus 2 in the second example embodiment.

Figure 4:
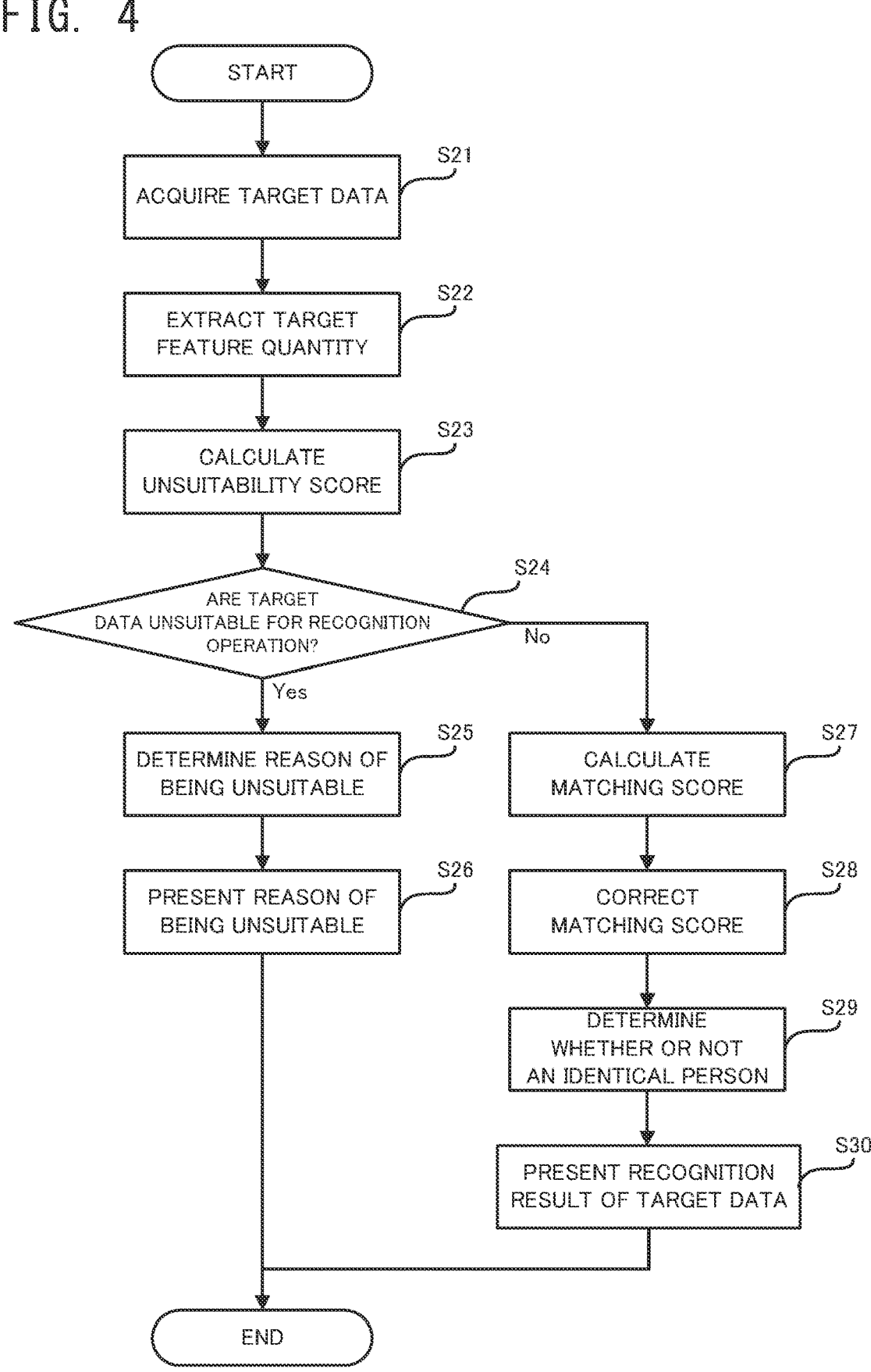
FIG. 4 is a flowchart illustrating a flow of a biometrics operation performed by the biometrics apparatus in the second example embodiment.

As illustrated in FIG. 4, the extraction unit 211 acquires the biological image serving as the target data BD (step S21). The extraction unit 211 extracts the target feature quantity BC that is the feature quantity of the biological image (step S22). The extraction unit 211 may extract the target feature quantity BC from target data BD by using the feature quantity generation model GM.

The calculation unit 212 calculates, as an unsuitability score WS, a first unsuitability score 1WS indicating a degree of similarity between the first unsuitability feature quantity 1WC and the target feature quantity BC, and a second unsuitability score 2WS indicating a degree of similarity between the second unsuitability feature quantity 2WC and the target feature quantity BC (steps S23).

The determination unit 213 determines whether or not the target data BD are unsuitable for the recognition operation, in response to the first unsuitability score 1WS and the second unsuitability score 2WS (step S24).

The feature quantities of the sample data having the unsuitability for recognition (i) are similar. Furthermore, the feature quantities of the sample data having the unsuitability for recognition (ii) are similar. In addition, the feature quantities of the sample data having the unsuitability for recognition (iii) are similar. On the other hand, the feature quantities of the sample data having the unsuitability for recognition (i), the feature quantities of the sample data having the unsuitability for recognition (ii), and the feature quantities of the sample data having the unsuitability for recognition (iii) are not similar to one another. Accordingly, in a case where the target data BD have the unsuitability for recognition (i), the target feature quantity BC that is the feature quantity of the target data BD, is similar to the feature quantity of the sample data having the unsuitability for recognition (i). Furthermore, in a case where the target data BD have the unsuitability for recognition (ii), the target feature quantity BC is similar to the feature quantity of the sample data having the unsuitability for recognition (ii). In addition, in a case where the target data BD have the unsuitability for recognition (iii), the target feature quantity BC is similar to the feature quantity of the sample data having the unsuitability for recognition (iii). That is, the determination unit 213 is allowed to determine that the target data BD whose feature quantity is similar to the unsuitability feature quantity WC set from the feature quantity of the sample data having any of the types of unsuitability for recognition, are unsuitable for the recognition operation, due to the unsuitability for recognition that causes the similar feature quantity.

For example, when the feature quantity generation model GM is expressed by a function f, the following can be satisfied;

Feature quantity of sample data having unsuitability for recognition=f (Sample data having unsuitability for recognition), and Target feature quantity BC=f (Target data BD).

The sample data having the unsuitability for recognition and the target data BD have a size of W100×H100×3 ch, for example. In addition, the feature quantity of the sample data having the unsuitability for recognition and the target feature quantity BC can be expressed by a 100-dimensional vector, for example. In this instance, the unsuitability feature quantity WC set on the basis of the feature quantities of the plurality of sample data having the unsuitability for recognition, can also be expressed by a 100-dimensional vector. A norm of each feature quantity may be 1.

In this instance, the calculation unit 212 may calculate the unsuitability score WS of the unsuitability feature quantity WC and the target feature quantity BC, by using a cosine similarity=<WC, BC> (an inner product of the unsuitability feature quantity WC and the target feature quantity BC). The cosine similarity corresponds to a value of cos(O) when an angle formed by two vectors is 0, and has such a property that it is a maximum value of 1 when the two vectors are the same, that it is 0 when the two vectors are orthogonal, and that it is a minimum value of −1 when the two vectors are oppositely directed. That is, the cosine similarity utilizes such a property that the feature quantities of data on the same individual are similar and tend to be directed in the same direction. In a case where the cosine similarity is used, the unsuitability score WS may take a value of −1 and 1. Hereinafter described is a case where the unsuitability score WS may take a value of −1 and 1.

The branching of a processing related to a value of the unsuitability score WS can be determined by a user as appropriate. For example, the determination unit 213 may determine that the corresponding target data BD are absolutely unsuitable for the recognition when one or more unsuitability scores WS of the corresponding target data BD are greater than or equal to a first value. Then, the biometrics apparatus 2 may end the processing without calculating a matching score CS with the registered feature quantity CC. For example, when the first value is 0.7, the first unsuitability score 1WS is 0.75, and the second unsuitability score 2WS is −0.8, since one or more unsuitability scores WS are greater than or equal to the first value, the corresponding target data BD are determined to be absolutely unsuitable for the recognition, and the processing may be ended without calculating the matching score CS with the registered feature quantity CC.

As a result of the determination in the step S24, when the target data BD are unsuitable for the recognition operation (the step S24: Yes), the determination unit 213 determines a reason why the target data BD are unsuitable for the recognition operation, in accordance with the first unsuitability score 1WS and the second unsuitability score 2WS (step S25). The determination unit 213 determines that the target data BD are unsuitable for the recognition operation is a first type of unsuitability, in a case where the first unsuitability score 1WS and the second unsuitability score 2WS indicate that the degree of similarity between the first unsuitability feature quantity 1WC and the target feature quantity BC is higher than the degree of similarity between the second unsuitability feature quantity 2WC and the target feature quantity BC. On the other hand, the determination unit 213 determines that the target data BD are unsuitable for the recognition operation is a second type of unsuitability, in a case where the first unsuitability score 1WS and the second unsuitability score 2WS indicate that the degree of similarity between the second unsuitability feature quantity 2WC and the target feature quantity BC is higher than the degree of similarity between the first unsuitability feature quantity 1WC and the target feature quantity BC.

The presentation unit 214 presents the reason why the target data BD are unsuitable for the recognition operation (step S26).

On the other hand, as a result of the determination in the step S24, when the target data BD are not unsuitable for the recognition operation (the step S24: No), the calculation unit 212 calculates the matching score CS indicating a degree of similarity between the target feature quantity BC and the registered feature quantity CC registered in advance (step S27).

Here, the extraction unit 211 may extract and register the registered feature quantity CC in advance, by using the feature quantity generation model GM. The feature quantity generation model GM may receive an input of the registered data CD and may generate the registered feature quantity CC that is a feature quantity of the registered data CD. The generated verification feature quantity CC may be stored and registered in the storage apparatus 22.

The recognition unit 216 may determine whether or not an identical person in accordance with the value of the matching score CS, as the biometrics. For example, the registered feature quantity CC and the target feature quantity BC may also be represented by vectors, and the determination unit 213 obtains an inner product of the registered feature quantity CC and the target feature quantity BC and may calculate the cosine similarity to be used as the matching score CS. In this instance, the matching score CS may take a value of −1 to 1. For example, when the matching score CS is greater than or equal to 0.5, a person may be determined to be an identical person, and when it is less than 0.5, the person may be determined to be another person. A value used for this determination may be arbitrarily determined by the user in accordance with the requirements.

That is, the calculation unit 212 that calculates the unsuitability score and the calculation unit 212 that calculates the matching score may have the same mechanism. The calculation unit 212 may calculate the unsuitability score WS indicating the degree of similarity between the unsuitability feature quantity WC and the target feature quantity BC, or may calculate the matching score CS indicating the degree of similarity between the target feature quantity BC and the registered feature quantity CC registered in advance. The calculation unit 212 is allowed to calculate the score by the same operation, even when inputted data are different. The calculation unit 212 may not calculate the unsuitability score WS and the matching score CS by using the cosine similarity, and may obtain a degree of similarity of an inter-vector distance such as Euclidean space distance, and may perform the calculation by any known method.

The correction unit 215 corrects the matching score CS in a case where the determination unit 213 determines that there is a possibility that the target data BD are unsuitable for the recognition (step S28). For example, it may be determined that there is a possibility that the corresponding target data BD are unsuitable for the recognition when one or more unsuitability scores WS of the target data BD are less than the first value and are greater than or equal to less than a second value, and the calculated value of the matching score CS may be corrected to be low. For example, when the first value is 0.7, the second value is −0.7, the first unsuitability score 1WS is 0.5, and the second unsuitability score 2WS is −0.8, one or more unsuitability scores WS are less than the first value and are greater than or equal to the second value, and it may be thus determined that there is a possibility that the corresponding target data BD are unsuitable for the recognition, and the calculated value of the matching score CS may be corrected to be low. On the other hand, for example, it may be determined that the corresponding target data BD are adequate for the recognition when all the unsuitability scores WS of the target data BD are less than the second value, and the calculated value of the matching score CS may not be corrected.

The correction unit 215 may correct the matching score CS to be lower as the value of the unsuitability score WS increases. That is, the correction unit 215 may correct the matching score CS such that authenticity of a person is evaluated smaller. In a case where there are a plurality of types of unsuitability for recognition, a method of correcting the matching score CS may be determined on the basis of the highest value of the unsuitability score WS. Correcting the matching score CS to be lower by the correction unit 215 may be linear transformation, or may be nonlinear transformation such as gamma correction, for example. For example, the correction unit 215 may perform the correction as follows: reducing the value of the matching score by 5% when one or more unsuitability scores are 0.65, reducing the value of the matching score by 3% when one or more unsuitability scores are 0, reducing the value of the matching score by 1% when one or more unsuitability scores are −0.65, and the like. In this case, for example, even if the matching score with certain registered data CD is 0.9, in a case where one or more first unsuitability scores 1WS are 0, the correction unit 215 corrects the corresponding matching score to 0.63. That is, the evaluation of probability of being the same target as the registered data CD, is lowered due to the correction by the correction unit 215.

Although described is an example in which the correction unit 215 changes reliability of the recognition in accordance with the unsuitability score WS, but in a case where the value of the unsuitability score WS exceeds a threshold, the correction unit 215 may uniformly correct the matching score CS to be low.

The recognition unit 216 determines whether or not an identical person, in accordance with the corrected matching score CS (step S29). The presentation unit 214 presents a recognition result of the target data BD (a determination result of whether or not the identical person) (step S30).

[2-4: Technical Effect of Biometrics Apparatus 2]

Since the biometrics apparatus 2 in the second example embodiment determines whether or not the data have a plurality of types of unsuitability for recognition for each type, it is possible to accurately determine whether or not the target data are unsuitable for the recognition operation, in regard to various types of unsuitability for recognition, thereby preventing the incorrect recognition. In addition, the biometrics apparatus 2 in the second example embodiment is configured to determine which target data having which type of unsuitability for recognition are unsuitable for the recognition operation, depending on which data having which type of unsuitability for recognition are adopted as the sample data.

In addition, since the biometrics apparatus 2 in the second example embodiment calculates the unsuitability score for each type of unsuitability for recognition, it is possible to determine the type of the unsuitability for recognition included in the target data. In a case where the feature quantity of the target data is similar to the feature quantity of data having certain unsuitability for recognition, it may be determined that the corresponding target data include the certain unsuitability for recognition. Therefore, the biometrics apparatus 2 in the second example embodiment is configured not only to determine that the corresponding target data are unsuitable for the recognition operation, but also to know why the target data are unsuitable for the recognition.

In addition, since the biometrics apparatus 2 in the second example embodiment calculates the unsuitability score for each type of different unsuitability for recognition, it is possible to determine to what extent the target data include which type of unsuitability for recognition. That is, the biometrics apparatus 2 in the second example embodiment is configured to determine the unsuitability for recognition with the highest unsuitability score, as the reason why the target data are unsuitable for the recognition operation.

In addition, since the biometrics apparatus 2 in the second example embodiment presents, to the outside, the reason why the target data are unsuitable for the recognition, an executor who performs the biometrics is able to know the reason why the target data are unsuitable for the recognition. By knowing the type of the unsuitability for recognition, the executor may be able to newly consider/examine a recognition mechanism specialized for the type. In addition, the executor may be able to determine that a situation of acquiring the target data is unsuitable, by knowing the type of the unsuitability for recognition. For example, the target data may be determined to be unsuitable for the recognition operation due to a malfunction in a device, such as dirt on a lens, or the like, of a camera that acquires the biological image. In this case, the unsuitability for recognition included in the target data may be improved by the executor adjusting the device.

In addition, since the biometrics apparatus 2 in the second example embodiment generates the target feature quantity and the unsuitability feature quantity by using the same feature quantity generation model GM, it is possible to accurately determine whether or not the data are unsuitable for the recognition operation. Furthermore, since the biometrics apparatus 2 in the second example embodiment performs the recognition by using the degree of similarity between the feature quantities generated by using the same feature quantity generation model GM, it is possible to accurately perform the biometrics.

Furthermore, since the biometrics apparatus 2 in the second example embodiment is configured to correct the matching score in a case where the target data include the unsuitability for recognition, it is possible to further increase the accuracy of the recognition. For example, when the unsuitability score of the target data is greater than or equal to or greater than a certain threshold, the determination unit 213 may determine that the target data are not used as data to be used for matching. On the other hand, when the determination unit 213 determines that the target data include the unsuitability for recognition, but are data usable for matching, the correction unit 215 may correct the matching score, thereby making it hard for the recognition unit 216 to determine that a person is an identical person.

Especially in the recognition of a living body, the incorrect recognition caused by an unsuitable image should be prevented. The biometrics apparatus 2 in the second example embodiment is configured to accurately recognize the biological image.

In the second example embodiment, described is a case where the target data BD are the biological image. The biological image may include a face image, an iris image, a fingerprint image, another image acquired from a living body, or the like. The target data BD may be data other than the biological image, and may be, for example, audio data other than the image. In the case of the audio data, the data having the unsuitability for recognition that deteriorates the accuracy of the recognition operation, can be considered to be data that do not include speech in which a noise tends to be intense.

3: Third Example Embodiment

Next, a biometrics apparatus, a biometrics method, and a recording medium according to a third example embodiment will be described. The following describes the biometrics apparatus, the biometrics method, and the recording medium according to the third example embodiment, by using a biometrics apparatus 3 to which the biometrics apparatus, the biometrics method, and the recording medium according to the third example embodiment are applied.

The biometrics apparatus 3 in the third example embodiment may have the same configuration as that of the biometrics apparatus 2 in the second example embodiment described above. The biometrics apparatus 3 in the third example embodiment is different in the type of the unsuitability for recognition, from the biometrics apparatus 2 in the second example embodiment. Other characteristics of the biometrics apparatus may be the same as those of the biometrics apparatus 2

In the third example embodiment, each of the target data BD and the plurality of sample data is an image in which a living body that is a target of the recognition operation living body is included. In the third example embodiment, the unsuitability for recognition includes at least one of (iv) unsuitability for recognition that the living body is included in the image in a condition where a predetermined area of at least a part of the living body is shielded, and (v) unsuitability for recognition that the living body is included in the image in a condition where another area that is different from the predetermined area of at least a part of the living body, is shielded. The predetermined area of at least a part of the living body may include a surrounding area of the living body. As a specific example, each of the target data BD and the plurality of sample data may be a face image in which a face of the living body that is the target of the recognition operation, is included. In this instance, the unsuitability for recognition may include at least one of (iv) unsuitability that the face is included in the face image in a condition where at least a part of the face is shielded by a mask worn by the living body, and (v) unsuitability that the face is included in the face image in a condition where at least a part of the face is shielded by a shield object that is different from the mask. In this specific example, an area shielded by the mask worn by the living body, may be an example of the predetermined area of at least a part of the living body, including a surrounding area of the living body.

[3-1: Biometrics Operation Performed by Biometrics Apparatus 3]

Figure 5:
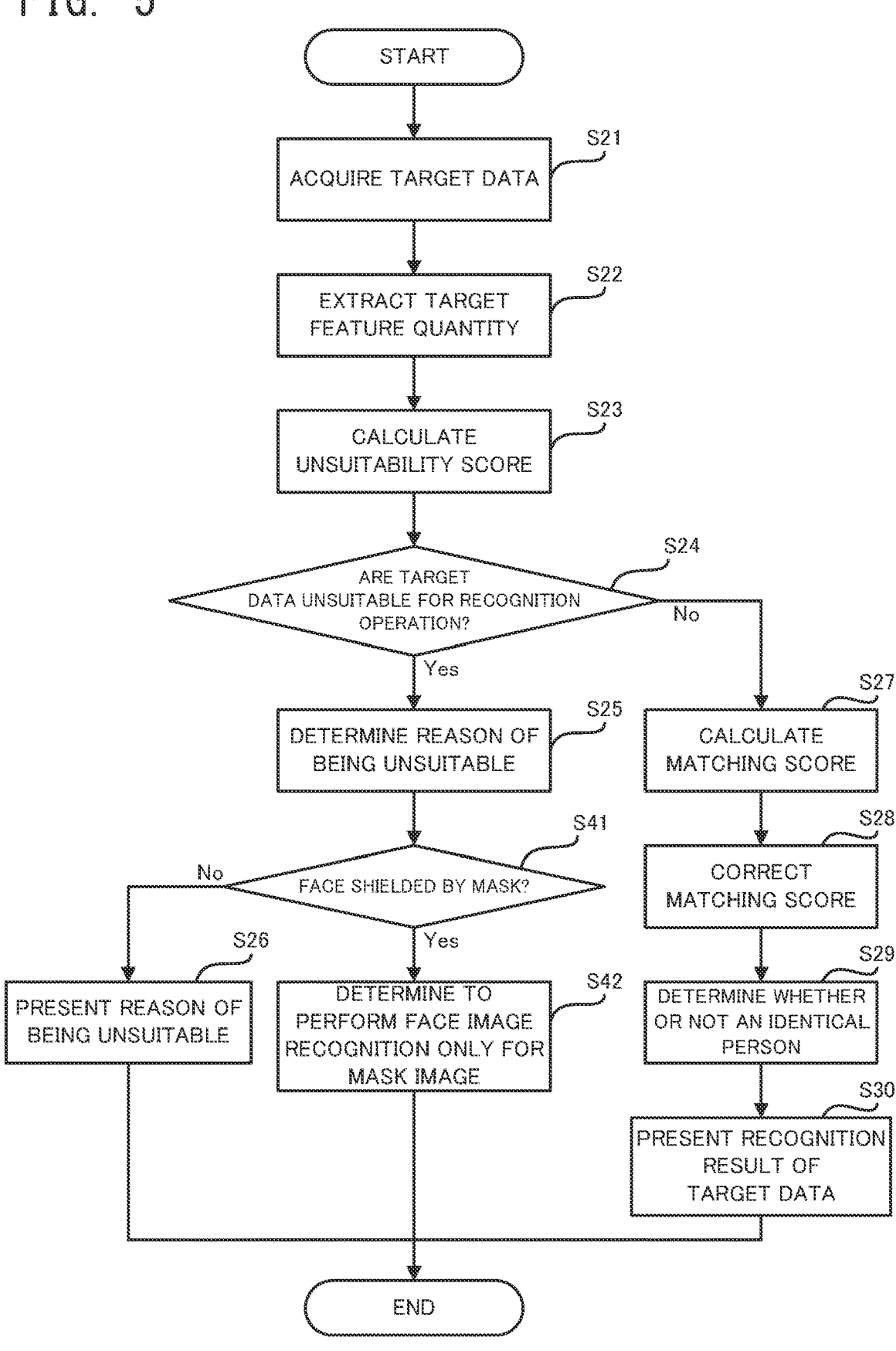
FIG. 5 is a flowchart illustrating a flow of a biometrics operation performed by a biometrics apparatus in a third example embodiment.

Hereinafter, a flow of the biometrics operation in the third example embodiment will be described with reference to FIG. 5. FIG. 5 is a flowchart illustrating the flow of the biometrics operation in the third example embodiment. In the following description, the processing steps already described carry the same step numbers, and a detailed description thereof will be omitted.

As illustrated in FIG. 5, even in the third example embodiment, as in the second example embodiment, the information processing apparatus 3 performs the operation from the step S21 to the step S25. In the third example embodiment, the determination unit 213 determines whether or not the reason why the target data BD are unsuitable for the recognition operation, which is determined in the step S25, is (iv) that the face is included in the face image in a condition where at least a part of the face is shielded by a mask worn by the living body (step S41).

As a result of the determination in step S41, when the reason why the target data BD are unsuitable for the recognition operation is (iv) (the step S41: Yes), the determination unit 213 determines that the corresponding target data BD are not unsuitable for the recognition operation. Specifically, the determination unit 213 may determine to perform, on the corresponding target data BD, face image recognition only for the face image in a condition where at least a part of the face is not shielded by the mask (step S42).

On the other hand, as a result of the determination in the step S41, when the reason why the target data BD are unsuitable for the recognition operation is not (iv) (the step S41: No), the processing proceeds to the step S26.

The face image in which the face is included in a condition where at least a part of the face is shielded by a shield object, is unsuitable to be used to perform a face recognition operation in many cases. For example, a face image of the living body wearing sunglasses by which the eyes and around the eyes are shielded, is considered to be unsuitable target data. These days, however, a wearing rate of the mask is so high that there are many cases where the face is included in the face image in a condition where at least a part of the face is shielded by the mask worn by the living body (hereinafter referred to as a "mask wearing image"). In addition, frequently wearing and taking off the mask for the biometrics is not desirable from the viewpoint of preventing the spread of infectious diseases. Note that the above-described area shielded by the sunglasses may be an example of another area that is different from the predetermined area of at least a part of the living body.

In response to this, progress is made in development of a mechanism that is configured to accurately recognize the mask wearing image. For example, it is possible to construct a recognition model capable of performing the recognition from the mask wearing image, by performing machine learning using a large amount of mask wearing images.

[3-2: Technical Effect of Biometrics Apparatus 31]

That is, even for the mask wearing image, it is possible to accurately perform the face recognize by using a dedicated mechanism. Therefore, it is possible to accurately recognize the mask wearing image, by distinguishing the mask wearing image from a shield image in which the living body is shielded by a shield object that is different from the mask such as sunglasses, for example.

The biometrics apparatus in the third example embodiment does not determine that the mask wearing image is an image that is eventually unsuitable for the recognition, but allows the mechanism suitable for the recognition of the mask wearing image, to perform the recognition. This allows the biometrics of a recognized target person, without the recognized target person taking off the mask.

For example, in a situation where the police use the face recognition, a worst-case scenario that should not happen is identifying an unrelated person as a person to look for due to the incorrect recognition, or the like. There are, however, some cases where an unrelated person is arrested due to the incorrect recognition, and it is mandatory to take countermeasures.

The biometrics apparatus described above, is configured to accurately determine whether or not the target data are unsuitable for the recognition operation, thereby preventing the incorrect recognition.

4: Supplementary Notes

With respect to the example embodiment described above, the following Supplementary Notes are further disclosed.

Supplementary Note 1

A biometrics apparatus including:

an extraction unit that extracts a target feature quantity that is a feature quantity of target data used to perform a recognition operation;

a calculation unit that calculates an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and a determination unit that determines whether or not the target data are unsuitable for the recognition operation in accordance with the unsuitability score.

Supplementary Note 2

The biometrics apparatus according to supplementary note 1, wherein the unsuitability feature quantity includes at least a first unsuitability feature quantity that is set on the basis of a feature quantity of each piece of a plurality of first sample data that deteriorate the accuracy of the recognition operation due to having a first type of unsuitability for recognition, and a second unsuitability feature quantity that is set on the basis of a feature quantity of each piece of a plurality of second sample data that deteriorate the accuracy of the recognition operation due to having a second type of unsuitability for recognition, which is different from the first type, the calculation unit calculates, as the unsuitability score, a first unsuitability score indicating a degree of similarity between the first unsuitability feature quantity and the target feature quantity, and a second unsuitability score indicating a degree of similarity between the second unsuitability feature quantity and the target feature quantity, and the determination unit determines whether or not the target data are unsuitable for the recognition operation in accordance with the first and second unsuitability scores.

Supplementary Note 3

The biometrics apparatus according to supplementary note 2, wherein the determination unit determines a reason why the target data are unsuitable for the recognition operation in accordance with the first and second unsuitability scores.

Supplementary Note 4

The biometrics apparatus according to supplementary note 3, wherein the determination unit determines that the reason why the target data are unsuitable for the recognition operation is the first type of unsuitability, in a case where the first and second unsuitability scores indicate that the degree of similarity between the first unsuitability feature quantity and the target feature quantity is higher than the degree of similarity between the second unsuitability feature quantity and the target feature quantity, and determines that the reason why the target data are unsuitable for the recognition operation is the second type of unsuitability, in a case where the first and second unsuitability scores indicate that the degree of similarity between the second unsuitability feature quantity and the target feature quantity is higher than the degree of similarity between the first unsuitability feature quantity and the target feature quantity.

Supplementary Note 5

The biometrics apparatus according to supplementary note 3 or 4, further comprising a presentation unit that presents the reason why the target data are unsuitable for the recognition operation.

Supplementary Note 6

The biometrics apparatus according to any one of supplementary notes 1 to 5, wherein
the extraction unit extracts the target feature quantity from the target data by using a feature quantity generation model, and
the unsuitability feature quantity is set on the basis of the feature quantity extracted from the plurality of sample data by using the feature quantity generation model.

Supplementary Note 7

The biometrics apparatus according to any one of supplementary notes 1 to 6, wherein
the calculation unit calculates a matching score indicating a degree of similarity between the target feature quantity and a registered feature quantity registered in advance, and
the biometrics apparatus further comprises a correction unit that corrects the matching score in a case where the determination unit determines that the target data are unsuitable for the recognition operation.

Supplementary Note 8

The biometrics apparatus according to supplementary note 7, wherein
the extraction unit extracts the registered feature quantity, and
the biometrics apparatus further comprises a storage unit that stores the registered feature quantity.

Supplementary Note 9

The biometrics apparatus according to any one of supplementary notes 1 to 8, wherein
each of the target data and the plurality of sample data is a biological image in which a living body that is a target of the recognition operation is included, and
the unsuitability for recognition includes at least one of unsuitability that the living body is included in the biological image in a condition where at least a part of the living body is blurred, unsuitability that the living body is included in the biological image in a condition where at least a part of the living body is shielded by a shield object, and unsuitability that a noise is superimposed on the biological image.

Supplementary Note 10

The biometrics apparatus according to any one of supplementary notes 1 to 9, wherein
each of the target data and the plurality of sample data is a face image in which a face of a living body that is a target of the recognition operation is included, and
the unsuitability for recognition includes at least one of unsuitability that the face is included in the face image in a condition where at least a part of the face is shielded by a mask worn by the living body, and unsuitability that the face is included in the face image in a condition where at least a part of the face is shielded by a shield object that is different from the mask.

Supplementary Note 11

The biometrics apparatus according to any one of supplementary notes 1 to 10, wherein
each of the target data and the plurality of sample data is an image in which a target of the recognition operation is included,
the unsuitability for recognition includes at least one of a third type of unsuitability for recognition that the target is included in the image in a condition where a predetermined area of at least a part of the target is shielded, and a fourth type of unsuitability for recognition that the target is included in the image in a condition another area that is different from the predetermined area of at least a part of the target, is shielded, and
the determination unit determines that the target data are not unsuitable for the recognition operation, in a case where it determines that the reason why the target data are unsuitable for the recognition operation, is the third type of unsuitability for recognition.

Supplementary Note 12

The biometrics apparatus according to supplementary note 11, wherein
the target is a living body, and
the predetermined area includes a surrounding area of the living body.

Supplementary Note 13

The biometrics apparatus according to any one of supplementary notes 1 to 12, wherein the unsuitability feature quantity is a mean value of feature quantities of the plurality of sample data.

Supplementary Note 14

A biometrics method including:
extracting a target feature quantity that is a feature quantity of target data used to perform a recognition operation;
calculating an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and
determining whether or not the target data are unsuitable for the recognition operation in accordance with the unsuitability score.

Supplementary Note 15

A recording medium on which a computer program that allows a computer to execute a biometrics method is recorded, the biometrics method including:
extracting a target feature quantity that is a feature quantity of target data used to perform a recognition operation;

19 calculating an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and determining whether or not the target data are unsuitable for the recognition operation in accordance with the unsuitability score.

At least a part of the constituent components of each of the example embodiments described above may be combined with at least another part of the constituent components of each of the example embodiments described above, as appropriate. A part of the constituent components of each of the example embodiments described above may not be used. Furthermore, to the extent permitted by law, all the references (e.g., publications) cited in this disclosure are incorporated by reference as a part of the description of this disclosure.

This disclosure is allowed to be changed, if desired, without departing from the essence or spirit of this disclosure which can be read from the claims and the entire identification. A biometrics apparatus, a biometrics method, and a recording medium with such changes are also intended to be within the technical scope of this disclosure.

DESCRIPTION OF REFERENCE CODES 1, 2 biometrics apparatus
11, 211 Extraction unit
12, 212 Calculation unit
13, 213 Determination unit
214 Presentation unit
215 Correction unit
GM Feature quantity generation model
BD Target data
BC Target feature quantity
WC Unsuitability feature quantity
WS Unsuitability score
1WC First unsuitability feature quantity
2WC Second unsuitability feature quantity
1WS First unsuitability score
2WS Second unsuitability score
CD Registered data
CC Registered feature quantity
CS Matching score

What is claimed is:
1. An apparatus comprising:
at least one memory that is configured to store instructions; and
at least one processor that is configured to execute the instructions to:
extract a target feature quantity that is a feature quantity of target data used to perform a recognition operation;
calculate an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and
determine whether or not the target data are unsuitable for the recognition operation in accordance with the unsuitability score,
wherein

20 the unsuitability feature quantity includes at least a first unsuitability feature quantity that is set on the basis of a feature quantity of each piece of a plurality of first sample data that deteriorate the accuracy of the recognition operation due to having a first type of unsuitability for recognition, and a second unsuitability feature quantity that is set on the basis of a feature quantity of each piece of a plurality of second sample data that deteriorate the accuracy of the recognition operation due to having a second type of unsuitability for recognition, which is different from the first type,
and
the at least one processor is configured to execute the instructions to:
calculate, as the unsuitability score, a first unsuitability score indicating a degree of similarity between the first unsuitability feature quantity and the target feature quantity, and a second unsuitability score indicating a degree of similarity between the second unsuitability feature quantity and the target feature quantity, and
determine whether or not the target data are unsuitable for the recognition operation in accordance with the first and second unsuitability scores.

2. The apparatus according to claim 1, wherein the at least one processor is configured to execute the instructions to determine a reason why the target data are unsuitable for the recognition operation in accordance with the first and second unsuitability scores.

3. The apparatus according to claim 2, wherein the at least one processor is configured to execute the instructions to:
determine that the reason why the target data are unsuitable for the recognition operation is the first type of unsuitability, in a case where the first and second unsuitability scores indicate that the degree of similarity between the first unsuitability feature quantity and the target feature quantity is higher than the degree of similarity between the second unsuitability feature quantity and the target feature quantity, and
determine that the reason why the target data are unsuitable for the recognition operation is the second type of unsuitability, in a case where the first and second unsuitability scores indicate that the degree of similarity between the second unsuitability feature quantity and the target feature quantity is higher than the degree of similarity between the first unsuitability feature quantity and the target feature quantity.

4. The apparatus according to claim 2, wherein the at least one processor is configured to execute the instructions to present the reason why the target data are unsuitable for the recognition operation.

5. The biometrics apparatus according to claim 1, wherein the at least one processor is configured to execute the instructions to extract the target feature quantity from the target data by using a feature quantity generation model, and
the unsuitability feature quantity is set on the basis of the feature quantity extracted from the plurality of sample data by using the feature quantity generation model.

6. The apparatus according to claim 1, wherein the at least one processor is configured to execute the instructions to:
calculate a matching score indicating a degree of similarity between the target feature quantity and a registered feature quantity registered in advance, and
correct the matching score in a case where the determination unit determines that the target data are unsuitable for the recognition operation.

7. The apparatus according to claim 6, wherein the at least one processor is configured to execute the instructions to:

extract the registered feature quantity, and store the registered feature quantity.

8. The apparatus according to claim 1, wherein each of the target data and the plurality of sample data is a biological image in which a living body that is a target of the recognition operation is included, and the unsuitability for recognition includes at least one of unsuitability that the living body is included in the biological image in a condition where at least a part of the living body is blurred, unsuitability that the living body is included in the biological image in a condition where at least a part of the living body is shielded by a shield object, and unsuitability that a noise is superimposed on the biological image.

9. The apparatus according to claim 1, wherein each of the target data and the plurality of sample data is a face image in which a face of a living body that is a target of the recognition operation is included, and the unsuitability for recognition includes at least one of unsuitability that the face is included in the face image in a condition where at least a part of the face is shielded by a mask worn by the living body, and unsuitability that the face is included in the face image in a condition where at least a part of the face is shielded by a shield object that is different from the mask.

10. The apparatus according to claim 1, wherein each of the target data and the plurality of sample data is an image in which a target of the recognition operation is included, the unsuitability for recognition includes at least one of a third type of unsuitability for recognition that the target is included in the image in a condition where a predetermined area of at least a part of the target is shielded, and a fourth type of unsuitability for recognition that the target is included in the image in a condition another area that is different from the predetermined area of at least a part of the target, is shielded, and the at least one processor is configured to execute the instructions to determine that the target data are not unsuitable for the recognition operation, in a case where it determines that the reason why the target data are unsuitable for the recognition operation, is the third type of unsuitability for recognition.

11. The apparatus according to claim 10, wherein the target is a living body, and the predetermined area includes a surrounding area of the living body.

12. The apparatus according to claim 1, wherein the unsuitability feature quantity is a mean value of feature quantities of the plurality of sample data.

13. A method comprising:

extracting a target feature quantity that is a feature quantity of target data used to perform a recognition operation;

calculating an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and determining whether or not the target data are unsuitable for the recognition operation in accordance with the unsuitability score, wherein the unsuitability feature quantity includes at least a first unsuitability feature quantity that is set on the basis of a feature quantity of each piece of a plurality of first sample data that deteriorate the accuracy of the recognition operation due to having a first type of unsuitability for recognition, and a second unsuitability feature quantity that is set on the basis of a feature quantity of each piece of a plurality of second sample data that deteriorate the accuracy of the recognition operation due to having a second type of unsuitability for recognition, which is different from the first type, and the method further comprising:

calculating, as the unsuitability score, a first unsuitability score indicating a degree of similarity between the first unsuitability feature quantity and the target feature quantity, and a second unsuitability score indicating a degree of similarity between the second unsuitability feature quantity and the target feature quantity, and determining whether or not the target data are unsuitable for the recognition operation in accordance with the first and second unsuitability scores.

14. A non-transitory recording medium on which a computer program that allows a computer to execute a method is recorded, the method including:

extracting a target feature quantity that is a feature quantity of target data used to perform a recognition operation;

calculating an unsuitability score indicating a degree of similarity between the target feature quantity and an unsuitability feature quantity that is set on the basis of a feature quantity of each piece of a plurality of sample data that deteriorate an accuracy of the recognition operation due to having the same type of unsuitability for recognition; and determining whether or not the target data are unsuitable for the recognition operation in accordance with the unsuitability score, wherein the unsuitability feature quantity includes at least a first unsuitability feature quantity that is set on the basis of a feature quantity of each piece of a plurality of first sample data that deteriorate the accuracy of the recognition operation due to having a first type of unsuitability for recognition, and a second unsuitability feature quantity that is set on the basis of a feature quantity of each piece of a plurality of second sample data that deteriorate the accuracy of the recognition operation due to having a second type of unsuitability for recognition, which is different from the first type, and the method further comprises:

calculating, as the unsuitability score, a first unsuitability score indicating a degree of similarity between the first unsuitability feature quantity and the target feature quantity, and a second unsuitability score indicating a degree of similarity between the second unsuitability feature quantity and the target feature quantity, and determining whether or not the target data are unsuitable for the recognition operation in accordance with the first and second unsuitability scores.

* * * * *